US008910102B2

(12) United States Patent
Choe (10) Patent No.: US 8,910,102 B2
(45) Date of Patent: Dec. 9, 2014

(54) CONFIGURING A PROGRAMMABLE LOGIC DEVICE USING A CONFIGURATION BIT STREAM WITHOUT PHANTOM BITS

(71) Applicant: Altera Corporation, San Jose, CA (US)

(72) Inventor: Kok Heng Choe, Penang (MY)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 13/781,350

(22) Filed: Feb. 28, 2013

(65) Prior Publication Data

US 2014/0245246 A1  Aug. 28, 2014

(51) Int. Cl.
*G06F 17/50* (2006.01)
(52) U.S. Cl.
CPC .................................. *G06F 17/505* (2013.01)
USPC ............................. 716/117; 716/104; 716/116
(58) Field of Classification Search
CPC ............. G05F 17/505; G06F 17/5027; G06F 17/5054; G06F 21/76
USPC ................................... 716/100–106, 116–117
See application file for complete search history.

(56) References Cited

U.S. PATENT DOCUMENTS

| 5,426,379 | A  | * | 6/1995  | Trimberger | ...................... 326/39 |
| 6,981,153 | B1 | * | 12/2005 | Pang et al. | ..................... 713/194 |
| 7,103,685 | B1 |   | 9/2006  | Trimberger |                              |
| 8,040,152 | B1 |   | 10/2011 | Han        |                              |

* cited by examiner

*Primary Examiner* — Paul Dinh
(74) *Attorney, Agent, or Firm* — Weaver Austin Villeneuve & Sampson LLP (57) ABSTRACT

Techniques and mechanisms generate a configuration bit stream to load into a circuit such as a Programmable Logic Device (PLD). A configuration bit stream may have a reduced size if "phantom bits" not corresponding to configuration elements are removed. However, the PLD may need a full-sized and properly ordered configuration bit stream in order to be properly configured. Techniques and mechanisms are described for selectively adding a "padding bit" to compensate for the missing phantom bits.

14 Claims, 10 Drawing Sheets

| Header 810 | Configuration Bits 820 |

| Header 855 | Configuration Bits 860 | Header 865 | Configuration Bits 870 | Header 875 | Configuration Bits 880 |

CONFIGURING A PROGRAMMABLE LOGIC DEVICE USING A CONFIGURATION BIT STREAM WITHOUT PHANTOM BITS

TECHNICAL FIELD

The present disclosure generally relates to integrated circuits. More specifically, the present disclosure relates to systems and methods for configuring a circuit using a configuration bit stream.

DESCRIPTION OF RELATED ART

A PLD is a semiconductor integrated circuit which contains logic circuitry and routing that may be configured to perform a host of logic functions. In a typical scenario, a designer uses electronic design automation (EDA) tools to create a design. The EDA tools create a configuration bit stream corresponding to the design. The configuration bit stream is used to configure or program configuration elements within the PLD in order to implement the desired functionality and routing. Configuration elements may include non-volatile memories (e.g., flash, antifuses, fuses) and/or volatile memories (e.g., static random-access memory (SRAM)) distributed throughout the PLD.

If the configuration elements are non-volatile memories, the configuration elements must be configured according to the configuration bit stream upon power-up of the PLD. Conventionally, bits from the configuration bit stream are loaded group-by-group into Data Registers. After the Data Registers are loaded with a group of bits, Address Registers are used to program or configure a particular group (e.g., a single column) of configuration elements corresponding to the bits in the configuration bit stream that are loaded into the Data Registers. However, not all of the locations created by the Data Registers and Address Registers correspond to a physical configuration element. Accordingly, a plurality of "phantom bits" which do not correspond to a physical configuration element, but which are still needed to properly load the Data Registers, are distributed throughout the configuration bit stream.

Removal of the phantom bits may reduce the size of the configuration bit stream.

Reducing the size of the configuration bit stream provides a multitude of advantages. Reduction of the configuration bit stream allows a smaller memory device to be used to store the configuration bit stream for PLDs with non-volatile configuration elements. For example, a PLD with on-chip flash storage to hold the configuration bit stream may require less flash memory to store the configuration bit stream. Using less flash memory may lead to higher yield rates, and therefore, reduced costs. Additionally, reducing the configuration bit stream size may allow multiple configuration bit streams to be stored in the same storage device. The multiple designs may be used in dual booting or partial reconfiguration of the PLD.

Conventional methodologies to reduce the size of the configuration bit stream are limited. For example, the configuration bit stream may be compressed and stored. However, compression is dependent upon the pattern of "1's" and "0's" in the configuration bit stream. Because different designs will have different configuration bit streams with different patterns, compression ratios for configuration bit streams will vary. Accordingly, a worst case compression ratio must be used in order to determine a flash memory size to store the configuration bit stream. Additionally, a compressed bit stream must be decompressed before configuring the PLD, a process which may significantly increase the total configuration time.

SUMMARY

The techniques and mechanisms of the present disclosure generate a configuration bit stream to load in a circuit, such as PLDs (including FPGAs, CPLDs, etc.), structured ASICs, ASICs, and other types of devices. The invention is primarily described with reference to PLDs as an example of a configurable circuit, but is not necessarily limited to PLDs.

The present invention provides improved mechanisms for using a smaller configuration bit stream which may be used to configure a PLD. In one example, a control block may receive a configuration bit stream without "phantom bits" which do not correspond to physical configuration elements. However, the received configuration bit stream without the phantom bits may be shorter than what is needed to properly configure the PLD. Accordingly, the control block may generate a new configuration bit stream with padding bits to replace the missing phantom bits. For instance, the control block may read or receive information regarding a design of the PLD. Based on the design details, the control block may output a bit from the received configuration bit stream, or a "padding bit" to account for the missing phantom bits. Thus, a new configuration bit stream may be generated by including bits from the received configuration bit stream and padding bits.

These and other features will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which illustrate specific embodiments of the present invention.

DETAILED DESCRIPTION OF PARTICULAR EMBODIMENTS

Figure 1:
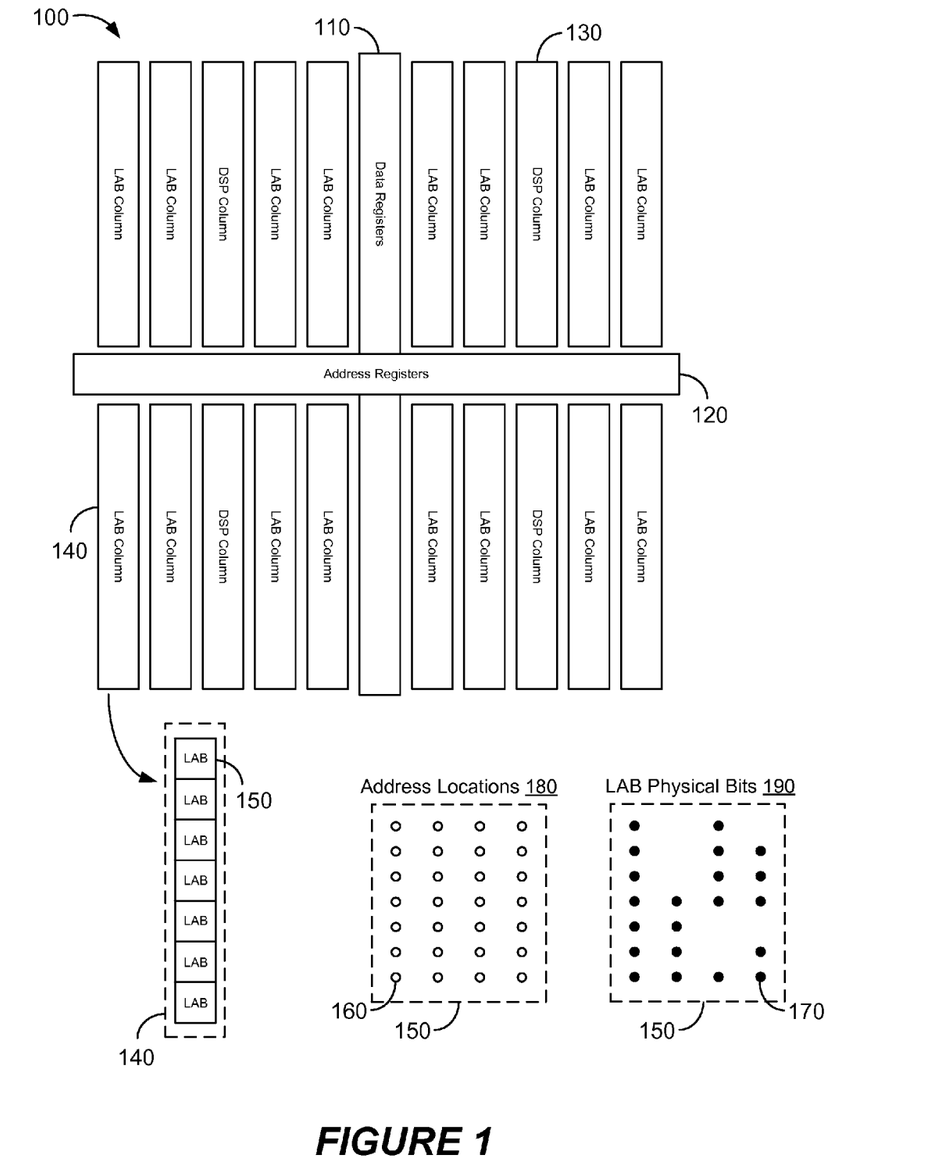
FIG. 1 illustrates one example of a design of a PLD and distributions of address locations and physical configuration elements for a particular resource type according to an exemplary embodiment.

FIG. 1 is an example of a schematic of a programmable logic device (PLD) that may be configured with a configuration bit stream. In an implementation, PLD 100 includes a plurality of columns arranged across 2 rows. Each column may contain a certain resource type. For example, in FIG. 1, DSP Column 130 may contain a plurality of resources, each corresponding to a digital signal processing (DSP) module.

In an implementation, LAB Column 140 may also contain a plurality of resources, each corresponding to a different resource type than DSP Column 130. LAB Column 140 may contain a plurality of logic array blocks (LABs), wherein each individual LAB contains a plurality of logic elements which may implement a variety of functions and/or routing. For example, in FIG. 1, LAB Column 140 may further include 7 LAB blocks, including LAB 150.

PLD 100 may also include Data Registers 110 along a vertical axis, and Address Registers 120 along a horizontal axis. In various implementations, the locations and orientations of Data Registers 110 and Address Registers 120 may be different. For example, Data Registers 110 may be oriented along the left or right sides of the PLD rather than through the middle and Address Registers 120 may be on the top or bottom sides of the PLD rather than through the middle of the PLD. In an implementation, the Data Registers 110 and Address Registers 120 may be switched such that Data Registers 110 is oriented along the horizontal axis and Address Registers 120 is oriented along the vertical axis.

Accordingly, Data Registers 110 and Address Registers 120 may be visualized as providing a coordinate system throughout the PLD. For example, in FIG. 1, Data Registers 110 may provide y-coordinates and Address Registers 120 may provide x-coordinates. In various implementations, the coordinate system may include the core or array of the PLD as well as periphery circuitry (e.g., I/Os, PLLs, etc.), memory devices (e.g., SRAM units on a PLD), etc. Accordingly, a variety of locations within the PLD may be addressed via the coordinate system provided by Data Registers 110 and Address Registers 120. The locations may correspond to configuration elements which may need to be programmed or configured in order to implement specific functionalities within the PLD.

However, in an implementation, not all of the locations provided by the coordinate system may be utilized. For example, a subset of the locations provided by the coordinate system may correspond with configuration elements such as configuration random access memory (CRAM) cells, which are configured to provide specified functionality, within a PLD. But, not all of the address locations provided by the coordinate system may correspond to a CRAM cell due to design considerations such as physical design issues (e.g., design, locations, sizes, design rules, etc. regarding metal layers, vias, contacts, and other elements of a physical layout design).

For example, referring back to LAB 150 of FIG. 1, a plurality of Address Locations 180 may correspond to LAB 150. The address locations, each represented by an empty circle such as Address Location 160, are available at all x, y coordinates. However, not all of the address locations correspond to a physical CRAM cell. LAB Physical Bits 190 illustrates a distribution of physical CRAM cells within LAB 150. LAB Physical Bits 190 shows that LAB 150 includes columns of CRAM cells. Physical CRAM cells, each represented by a solid circle such as CRAM cell 170, may be a subset of Address Locations 180. As such, several address locations do not correspond to an existing CRAM cell for LAB 150.

Figure 2:
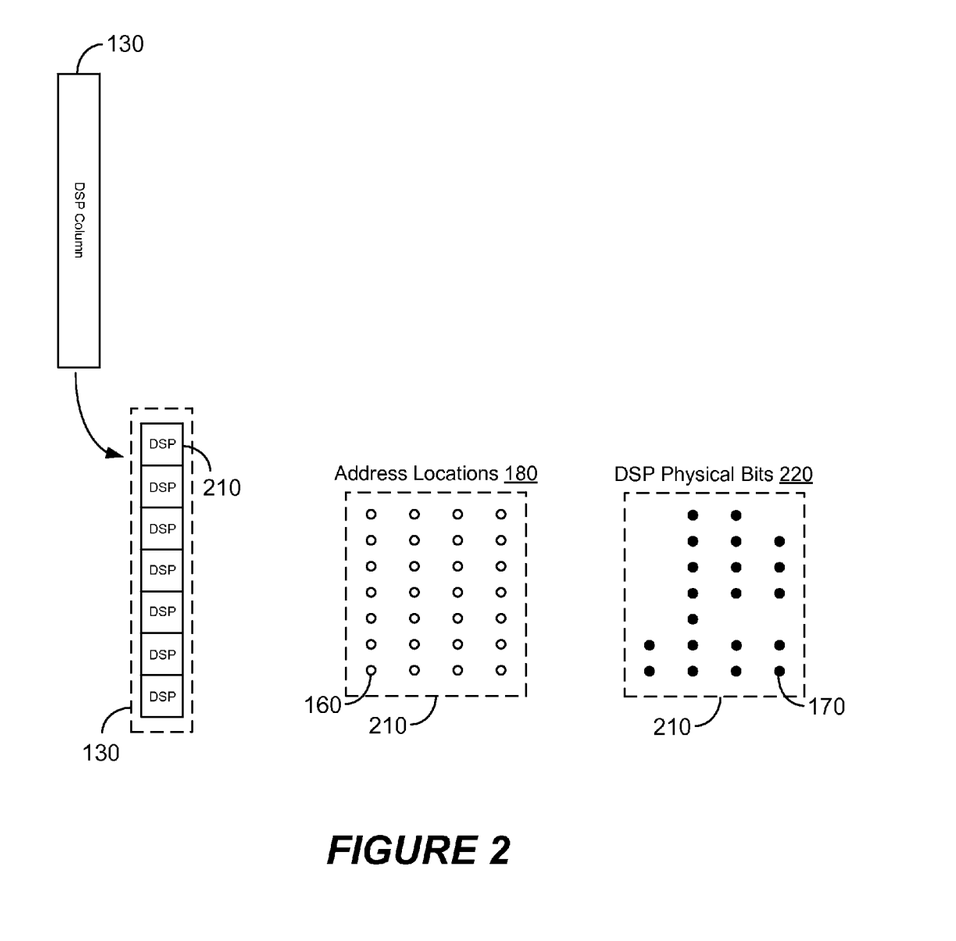
FIG. 2 illustrates another example of distributions of address locations and physical configuration elements for a different resource type according to an exemplary embodiment.

Additionally, in some implementations, different resource types (i.e., different types of modules such as DSP Modules, LAB Modules, memory modules, I/Os and other periphery circuitry, etc.) may have a different distribution of CRAM cells. FIG. 2 illustrates an example of the distribution of CRAM cells for DSP Column 130, which differs from the distribution of CRAM cells for LAB Column 140, as previously described. In FIG. 2, DSP Column 130 of FIG. 1 may include a plurality of DSP modules, including DSP Module 210. As previously discussed, DSP Module 210 also has a plurality of Address Locations 180 corresponding to the coordinate system provided by Data Registers 110 and Address Registers 120. DSP Physical Bits 220 illustrates a distribution of physical CRAM cells within DSP Module 210. DSP Physical Bits 220 shows that DSP 210 includes columns of CRAM cells. Physical CRAM cells, each represented by a solid circle such as CRAM cell 170, are also a subset of Address Locations 180. Just as with LAB 150 of FIG. 1, DSP Module 210 also has several address locations which do not correspond to an existing CRAM cell. However, the distribution of CRAM cells within DSP Module 210 differs from the distribution of CRAM cells within LAB 150.

Figure 3A:
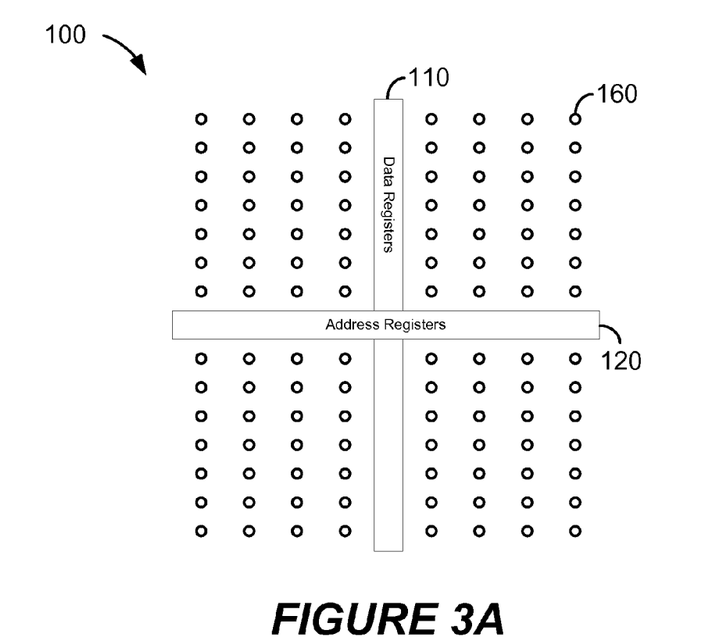
FIG. 3A illustrates an example of a distribution of address locations within a PLD according to an exemplary embodiment.

Thus, in one implementation as shown in FIG. 3A, PLD 100 may include a "sea" of coordinates or address locations, such as Address Location 160, the coordinates or address locations provided by Data Registers 110 and Address Registers 120.

Figure 3B:
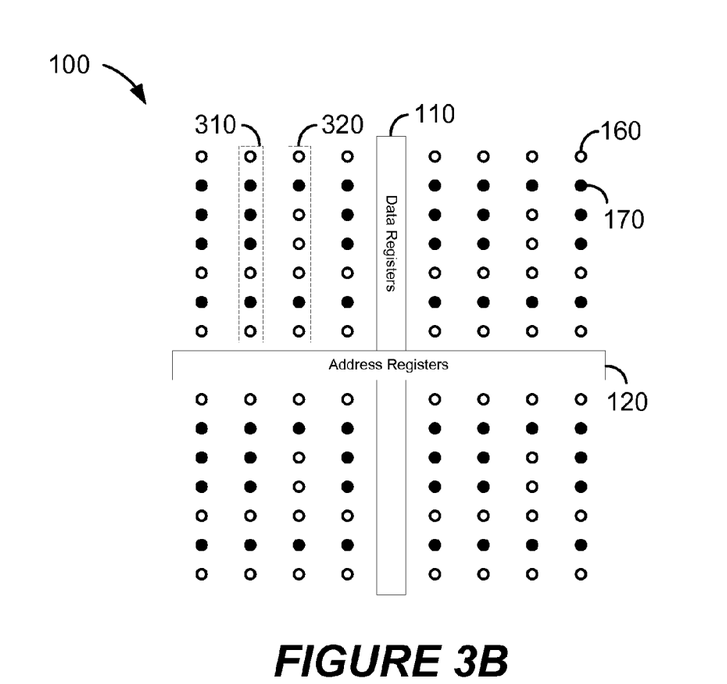
FIG. 3B illustrates an example of a distribution of address locations and physical configuration elements within a PLD according to an exemplary embodiment.

Additionally, in one implementation as shown in FIG. 3B, a subset of the coordinates or address locations are associated with physically-existing CRAM cells, such as CRAM cell 170. Moreover, each column may have a different distribution of physically-existing CRAM cells due to columns containing different resource types. For example, in the simplified implementation of FIG. 3B, Column 310 may include one type of resource type, such as DSP Modules, while Column 320 may contain a different type resource type, such as LAB Modules. Because DSP Modules and LAB modules have different functionalities and physical layouts, the distribution of physically-existing CRAM cells within each of these resource types also differs. As such, Column 310 has a different distribution of CRAM cells than Column 320.

Thus, a coordinate system of a PLD has more address locations than actual CRAM cells. Additionally, different resource types utilized within the PLD may have different distributions of physical CRAM cells.

Figure 4:
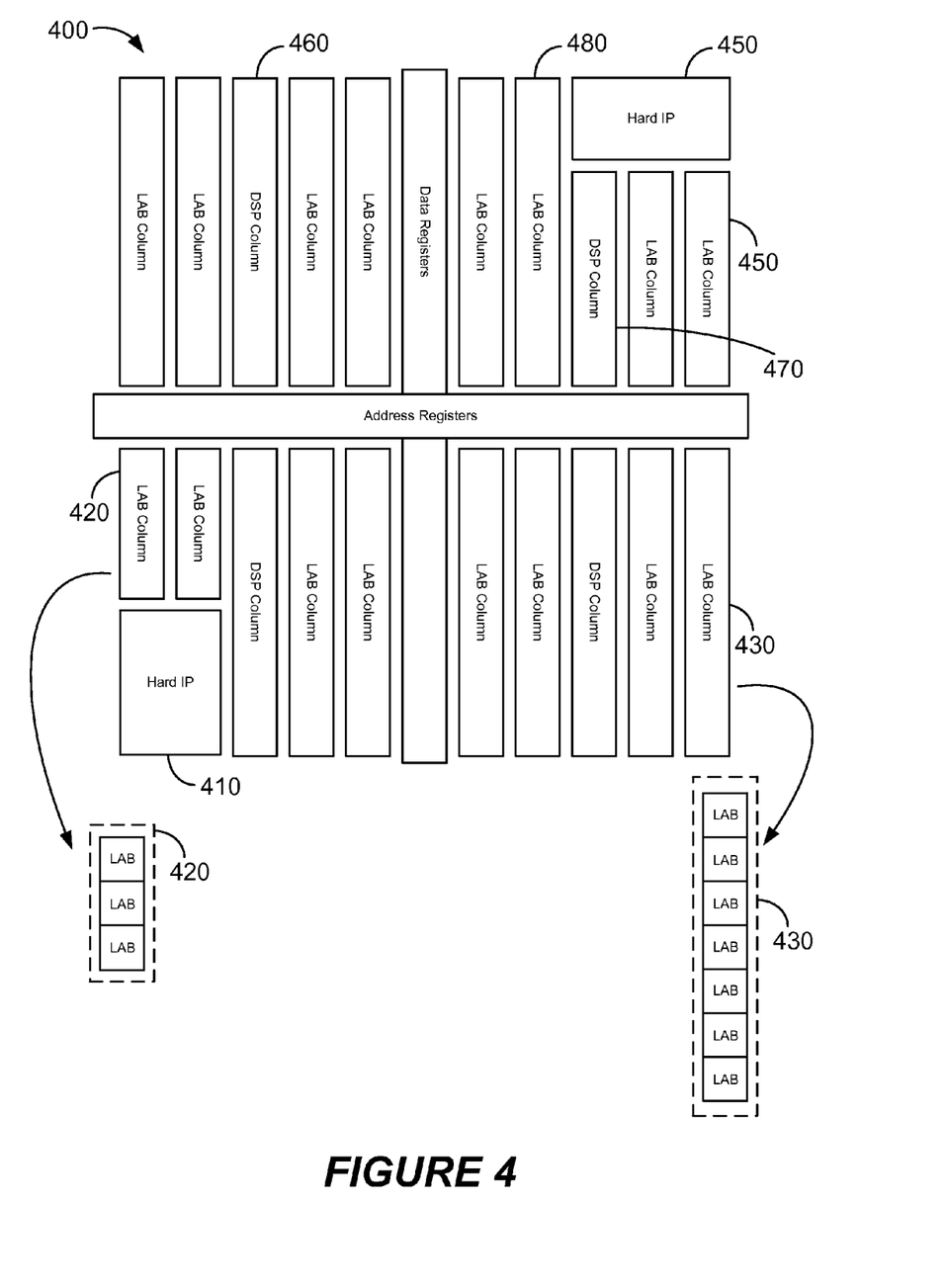
FIG. 4 illustrates an example of Hard IP blocks affecting a distribution of physical configuration elements and resources within a PLD according to an exemplary embodiment.

FIG. 4 is another example of a schematic of a programmable logic device (PLD) that may be configured with a configuration bit stream. In an implementation, PLD 400 also includes a plurality of columns arranged across 2 rows. Each column may contain a certain resource type. For example, in FIG. 4, DSP Column 460 may contain a plurality of resources, each corresponding to a digital signal processing (DSP) module. LAB Column 430 may also contain a plurality of resources, each corresponding to a Logic Array Block (LAB).

PLD 400 may also include Hard Intellectual Property (IP) Block 410 and Hard IP Block 450. Hard IP Blocks 410 and 450 may include a variety of hard, or hardened or hardwired, functionality. For example, Hard IP Blocks 410 and 450 may include microprocessors, controllers for a variety of functions, clocking circuitry, memory interfaces, memory, configuration circuitry, or any other type of circuitry. In any case, Hard IP 410 and 450 are generally fixed functionality, rather than user configurable such as DSP Modules or LAB modules, within the PLD 400. As such, Hard IP 410 and Hard IP 450 may lack user-configurable CRAM cells. Since Hard IP 410 and Hard IP 450 are within the coordinate system provided by the Data Registers and Address Registers, they overlap with address locations, but lack physically existing CRAM cells associated with the address locations.

Additionally, Hard IP Block 410 and Hard IP Block 450 may cause a column to have a difference in the number and/or arrangement of resources compared to another column. In the implementation shown in FIG. 4, Hard IP Block 450 is in the top-right quadrant of PLD 400. Hard IP Block 450 may occupy a certain area of PLD 400, causing DSP Columns and/or LAB Columns to have less DSP Modules or LAB Modules compared to other DSP Columns and LAB Columns. For example, LAB Column 430 may have 7 LAB modules. Likewise, LAB Column 480 may also include 7 LAB modules. However, LAB Column 450 may have a different number and/or arrangement of LAB modules compared to LAB Columns 430 and 460. For example, LAB Column 450 may have 4 rows of LAB modules due to Hard IP Block 450 making use of a certain area of PLD 400 that would otherwise be available to columns, such as LAB Columns or DSP Columns. Likewise, Hard IP Block 410 also makes use of a certain area of PLD 400, causing a column, such as LAB Column 420, to also have a different number and/or arrangement of LAB Modules. In the implementation of FIG. 4, LAB Column 420 may have 3 LAB Modules due to Hard IP Block 410 occupying area of PLD 400.

Thus, a coordinate system of a PLD has more address locations than actual CRAM cells. Additionally, different resource types utilized within the PLD may have different distributions of physical CRAM cells. Moreover, fixed functionality, such as hard IP blocks, may cause a column to have a different number and/or arrangement of resources. As such, a configuration bit stream, which is used to configure a device by indicating how to configure the CRAM cells within the PLD, may include a plurality of bits corresponding to address locations which do not have corresponding physical CRAM cells.

Accordingly, a configuration bit stream may be shortened or reduced such that "phantom bits" which do not correspond to physical CRAM cells may be removed instead of retaining a "dummy" or filler bit.

Figure 5:
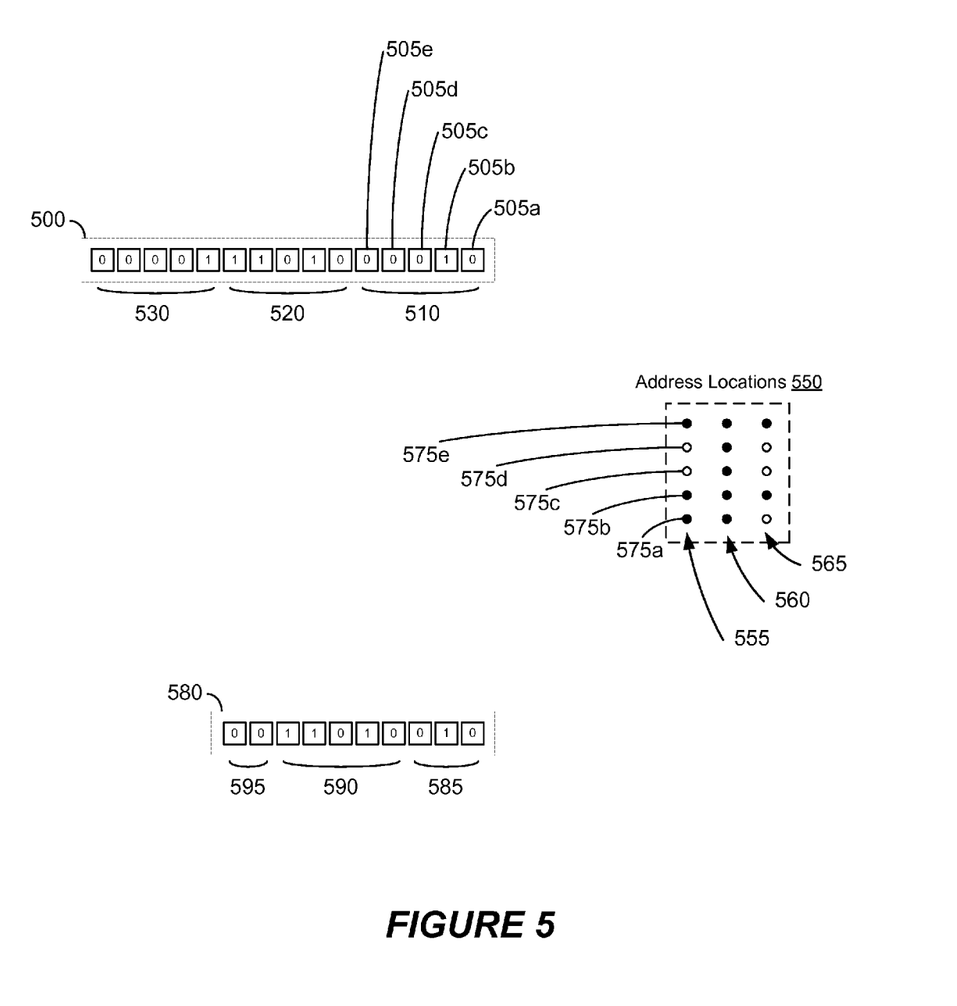
FIG. 5 illustrates an example of removing "phantom bits" from a configuration bit stream according to an exemplary embodiment.

FIG. 5 illustrates an implementation of removing phantom bits from a configuration bit stream which do not correspond to actual physical CRAM cells on a PLD. In FIG. 5, Original Bit Stream 500 may include fifteen bits. The 15 bits of Original Bit Stream 500 may be divided into three groups, 510, 520, and 530. Each of the Groups 510, 520, and 530 may correspond to a particular group of address locations of the PLD. For example, Group 510 may correspond to Addresses 555 of Address Locations 550. Group 520 may correspond to Addresses 560. Moreover, Group 530 may correspond to Addresses 565.

Additionally, each bit within Original Bit Stream 500 corresponds to a particular address location. For example, Bit 505a may correspond with Address 575a. Bit 505b may correspond with Address Location 575b. Bit 505c may correspond with Address Location 575c. Bit 505d may correspond with Address Location 575d. And, Bit 505e may correspond with Address Location 575e. Additionally, Address Locations 575a, 575b, and 575e may correspond to physical CRAM cells. Address locations 575c and 575d may not correspond to physical CRAM cells.

As such, the size of a configuration file may be reduced because bits which do not correspond to physical CRAM cells may be removed from Original Bit Stream 500 because the data at the corresponding locations within Original Bit Stream 500 are not used to configure a CRAM cell. For example, the "0" represented by 505c and the "0" represented by 505d do not configure a physical CRAM cell, and are thus phantom bits. However, the "0" represented by 505a, "1" represented by 505b, and "0" represented by 505e may be used to configure physical CRAM cells.

Accordingly, Reduced Configuration Bit Stream 580 may be generated. Reduced Configuration Bit Stream 580 includes 5 less bits than Original Bit Stream 500 by not retaining the phantom bits. In particular, the bits corresponding to address locations without corresponding physical CRAM cells are missing. For example, for Group 510, bits 505c and 505d are missing because, as previously discussed, Address Locations 575c and 575d do not have corresponding physical CRAM cells and thus, these bits are phantom bits. Accordingly, Group 585 of Reduced Configuration Bit Stream 580 represents the data included in Group 510 of Original Bit Stream 500 that have corresponding physical CRAM cells. Group 590 includes all of the bits of Group 520 because Addresses 560 of the Address Locations 550 has every address location corresponding to a physical CRAM cell. Additionally, Group 595 only has two bits instead of five as represented by Group 530 because Column 565 of Address Locations 550 only has two address locations that correspond with physical CRAM cells.

Figure 6:
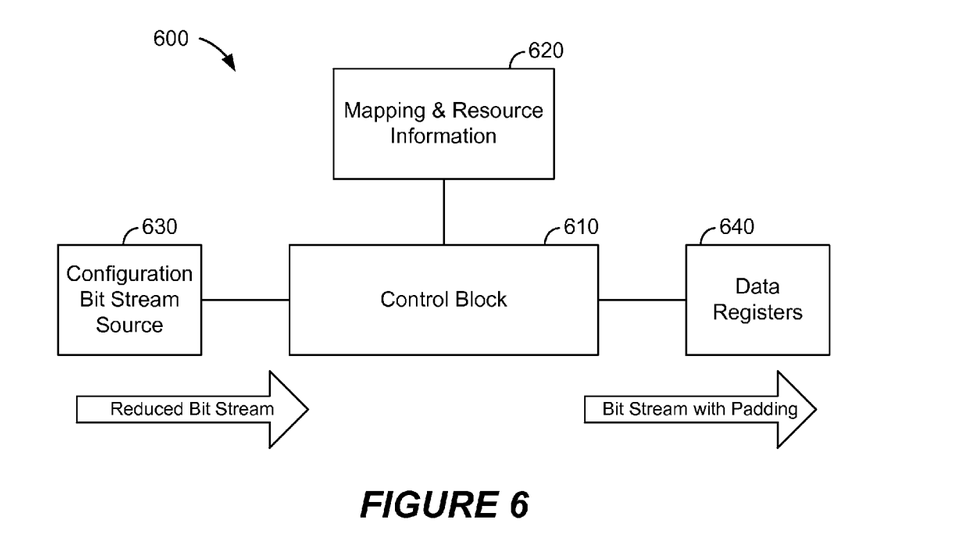
FIG. 6 illustrates an example of a system for padding a configuration bit stream to compensate for missing phantom bits according to an exemplary embodiment.

FIG. 6 shows a schematic of a system 600 used to generate a configuration bit stream with padding bits for a PLD based upon using a bit stream such as Reduced Configuration Bit Stream 580 from FIG. 5. In FIG. 6, system 600 includes circuits Control Block 610, Mapping and Resource Information 620, Configuration Bit Stream Source 630, and Data Registers 640.

Configuration Bit Stream Source 630 may provide a configuration bit stream to an input of Control Block 610. Configuration Bit Stream Source 630 may be a circuit in the PLD (e.g., a memory), or it may be an off-chip device used to store a configuration bit stream. As discussed previously, the configuration bit stream provides data indicating how to configure the CRAM cells within a PLD. Control block 610 circuitry may receive, as an input, the configuration bit stream from Configuration Bit Stream Source 630. However, as previously discussed, in one implementation, the configuration bit stream received from Configuration Bit Stream Source 630 has less data (e.g., bits) than the number of address locations (i.e., locations or coordinates provided by the Address and Data Registers) within the PLD because the phantom bits are missing. As discussed previously, in some implementations, this reduced configuration bit stream may be configured such that bits corresponding to address locations without corresponding physical CRAM cells may not be represented within the bit stream. As such, the reduced configuration bit stream received from Configuration Bit Stream Source 530 has less bits or data than address locations. However, a PLD may need bits for every location because bits or data must properly populate a shift register, such as Data Registers 640, before the Address Registers allow the PLD to configure a group of physical CRAM cells. Therefore, in an implementation, the Control Block 610 may generate a new configuration bit stream with padding bits such that the generated configuration bit stream has the proper amount of bits or data. Additionally, the newly generated configuration bit stream may be in a proper order such that the bits from the received configuration bit stream will still correspond to physical CRAM cells. Thus, the Control Block 610 circuit may generate the new configuration bit stream that is shifted into Data Registers 540 by using the configuration bit stream provided by the Configuration Bit Stream Source 630 and including padded bits for the missing phantom bits in the reduced configuration bit stream provided by Configuration Bit Stream Source 630.

Figure 7:
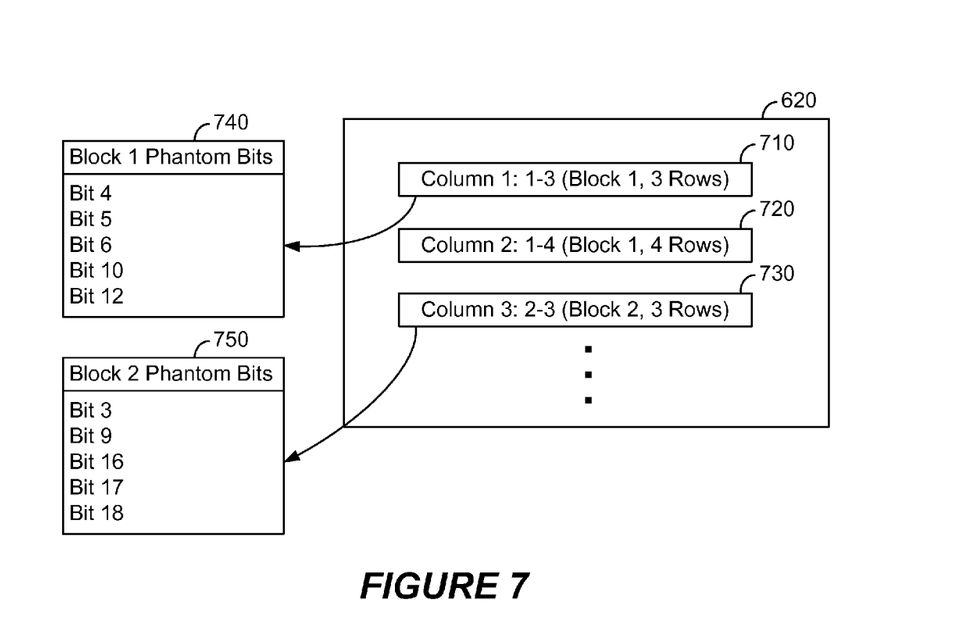
FIG. 7 illustrates a representation of storing information on a design of a PLD according to an exemplary embodiment.

In one implementation, Mapping and Resource Information 620 may be a circuit including a variety of information regarding a design of a PLD such as information regarding address locations, physical CRAM cells, address locations or bits that correspond to phantom bits (e.g., the phantom bits for a particular resource type), address locations or bits that correspond to physical CRAM cells (e.g., the bits that correspond to physical CRAM cells for a particular resource type), number of columns, the types of resources used in columns, number of rows of resources for columns, arrangement of resources within a column, the resource types of the PLD, and other details on the architecture of the design. FIG. 7 is an illustration of Mapping and Resource Information 620 storing information that may be used to generate a new configuration bit stream for a programmable logic device (PLD). In FIG. 7, Mapping and Resource Information 620 may include data on the columns of the PLD, including columns, the type of resource used within the column, and the number of rows of the resource within the column. For example, in FIG. 7, information on a first column is available at 710. Information on a second column is available at 720. Additionally, information for a third column is available at 730. Information on all or a subset of columns within a PLD may be available.

Column Information 710 provides information on a first column, including the type of resource (e.g., Block 1, which may be a LAB Module, DSP Module, etc.) and the number of rows of that resource within the specified column. Additionally, Mapping and Resource Information includes information on the phantom bits for a particular resource type. For example, in FIG. 7, Block 1 Phantom Bits 740 includes a list of phantom bits. The phantom bits for Block 1 are bit four, bit five, bit six, bit ten, and bit twelve. Likewise, Column Information 730 provides information on another column, including the type of resource (e.g., Block 2, which may be a LAB Module, DSP Module, etc.) and the number of rows of that resource within the particular column. Additionally, Mapping and Resource Information includes information on the phantom bits for the resource type of Block 2. For example, in FIG. 7, Block 2 Phantom Bits 750 includes a list of phantom bits. The phantom bits for Block 2 are bit three, bit nine, bit sixteen, bit seventeen, and bit eighteen. In other implementations, bits that are not phantom bits (i.e. bits that are affirmatively represented in the reduced bit stream) may be identified.

Accordingly, Control Block 610 may use the preceding information to determine how to generate a new configuration bit stream to send to Data Registers 640 such that padding bits are included with the bit stream received from Configuration Bit Stream Source 630. In an implementation, when reading or obtaining information from Mapping and Resource Information 620, the Control Block 610 may output a padding bit, such as a "0" or a "1," when needed.

For example, for Block 1 Phantom Bits 740, bits zero to three may be bits received from Configuration Bit Stream Source 630. However, bits four to six have been marked as phantom bits that have been removed from the bit stream received from Configuration Bit Stream Source 630. Accordingly, Control Block 610 may output the bits received as an input from Bit Stream Source 630 for bits zero to three. However, since bits four to six have been indicated as being removed due to being phantom bits, Control Block 610 may output padding bits to Data Registers 640 to account for the missing phantom bits from the reduced bit stream received from Configuration Bit Stream Source 630. Thus, a generated bit stream of the appropriate length and order may be sent to Data Registers 640. Additionally, the generated bit stream may retain the correct data for each physical CRAM cell, but has filler or padded bits for the phantom bits that do not correspond to physical CRAM cells.

Thus, a shortened configuration bit stream without phantom bits may be received from Configuration Bit Stream Source 630. Control Block 610 may then selectively either output a padding bit to account for a phantom bit, or output a bit from the reduced bit stream received from Configuration Bit Stream Source 630. Accordingly, Data Registers 640 may receive the generated bit stream from Control Block 610 and may subsequently be loaded address-by-address by Address Registers. As such, the PLD may be properly configured.

In some implementations, the shortened configuration bit stream may be missing a subset of all the phantom bits. For example, the first half of a configuration bit stream may not include phantom bits, and therefore may need to be padded, but the second half of the configuration bit stream may include phantom bits, and therefore may not need to be padded.

In some implementations, Control Block 610 may operate at a higher frequency than the rate at which the Configuration Bit Stream Source 630 operates. In an implementation, Control Block 610 may operate at least twice as fast as the rate that Configuration Bit Stream Source 630 transmits the reduced configuration bit stream (i.e., a bit stream without phantom bits) to Control Block 610. For example, if Control Block 610 operates at least twice as fast as the frequency of the rate that the Configuration Bit Stream Source 630 streams the reduced configuration bit stream at, Control Block 610 may read Mapping and Resource Information 620 and determine whether to output a padding bit or a bit from the received configuration bit stream. As such, Control Block 610 may efficiently and properly output a padded bit or bit from the received reduced configuration bit stream.

Additionally, in an implementation, Control Block 610 may read Mapping & Resource Information 620 and determine whether to output a padding bit. If a padding bit is not needed, Control Block 610 may request a bit from Configuration Bit Stream Source 630 and output the received bit to the Data Registers.

In some implementations, Mapping and Resource Information 620 may be hardcoded into a PLD. For example, Mapping and Resource Information may be represented as hard coded bits by tying to logic "0" or "1" (i.e., low or high). Mapping and Resource Information 610 may be configured via fuses or antifuses. Alternatively, Mapping and Resource Information 620 may include a type of memory, including non-volatile memory. For example, non-volatile flash memory may be utilized.

Figure 8A:
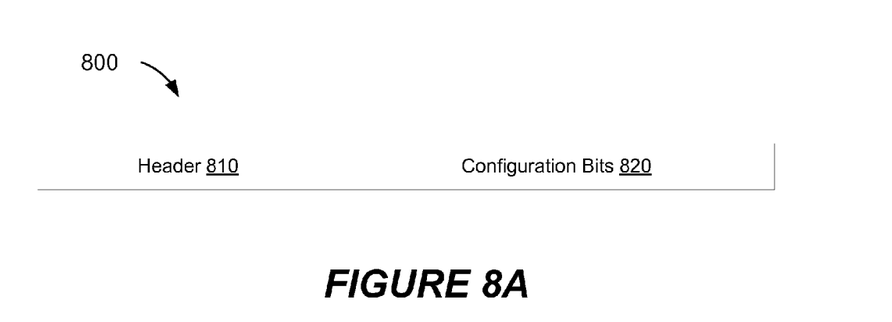
FIG. 8A illustrates one example of including design information of a PLD in a header portion of a configuration bit stream according to an exemplary embodiment.

In an implementation, Mapping and Resource Information 620 may store data read from a header of a configuration bit stream. For example, in FIG. 8A, the configuration bit stream 800 received from Configuration Bit Stream Source 630 may include a header 810 and configuration bits 820. Header 810 may include a variety of data, including information for Mapping and Resource Information 620. Accordingly, relevant information from Header 810 may be stored in Mapping and Resource Information 620. After the appropriate information from Header 810 is stored in Mapping and Resource Information 620, Control Block 610 may refer to the stored information when determining whether to output a padded bit.

Figure 8B:
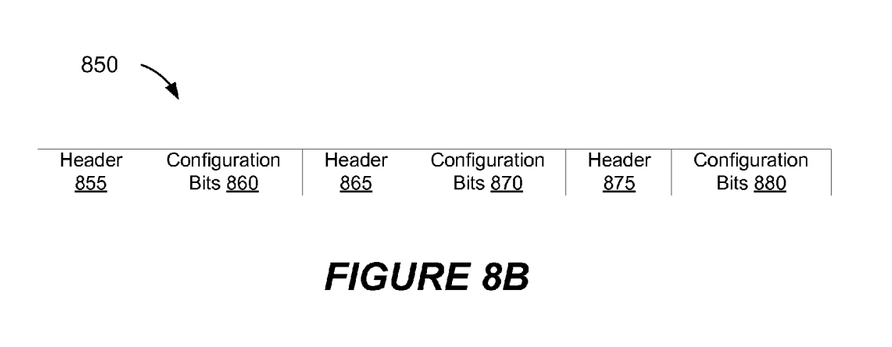
FIG. 8B illustrates another example of including design information of a PLD in a header portion of a configuration bit stream according to an exemplary embodiment.

FIG. 8B shows another implementation of adding mapping and resource information to a configuration bit stream. In FIG. 8, the Bit Stream 850 includes three headers sections (855, 865, and 875) and three configuration bit sections (8660, 870, and 880). The header sections may include a variety of data, including mapping and resource information that may be stored in Mapping and Resource Information 620 and used by Control Block 610 when generating a new configuration bit stream with padding bits. However, in FIG. 8B, the header information may be split across Bit Stream 850. In an implementation, the header sections may include information for a part of the PLD. For example, Header 855 may include information for a single column, such as a column's resource type, number of rows of the resource within the column, and the phantom bits for the resource. Configuration Bits 860 may include information for the bits corresponding to physical CRAM cells for the particular column. Header 865 may include similar information for a second column, while Configuration Bits 870 may include information for the bits corresponding to the physical CRAM cells for its column. Likewise, Header 875 and Configuration Bits 880 may include information for a third column. As such, information from a header section may be stored into Mapping and Resource Information 620. For example, information on a first column in Header 855 may be stored in Mapping and Resource Information 620. After Header 855, Configuration Bits 860 for the first column may be received by Control Block 610. Accordingly, Control Block 610 may determine whether to output a padded bit or a bit from Configuration Bits 860 upon reading the stored information in Mapping and Resource Information 620. After Configuration Bits 860, another header section including information on a second column, Header 865, may be received by Control Block 610. Accordingly, the information may subsequently be stored in Mapping and Resource Information 620, either by replacing the previous information or keeping the previous information and adding the new information from Header 865 to the storage within Mapping and Resource Information 620. A second column's configuration bits may be received in Configuration Bits 870. Accordingly, Control Block 610 may also determine whether to output a padded bit or a bit from Configuration Bits 860 upon reading the stored information for the second column in Mapping and Resource Information 620.

In one implementation, information regarding the mapping and resource information for a PLD may be hardcoded in the PLD as well as received from a header section of a configuration bit stream. For example, a header section may include information on the type of resource used in a column followed by configuration bits. However, Mapping and Resource Information 620 may include the mapping information (e.g., phantom bits for a resource type) hardwired on the PLD. Accordingly, a hybrid approach wherein information is split between the header and Mapping and Resource Information 620 may be used in an implementation. The information may be split in any combinations. Additionally, information may be redundant. For example, both the header and PLD may include the same information.

Figure 9:
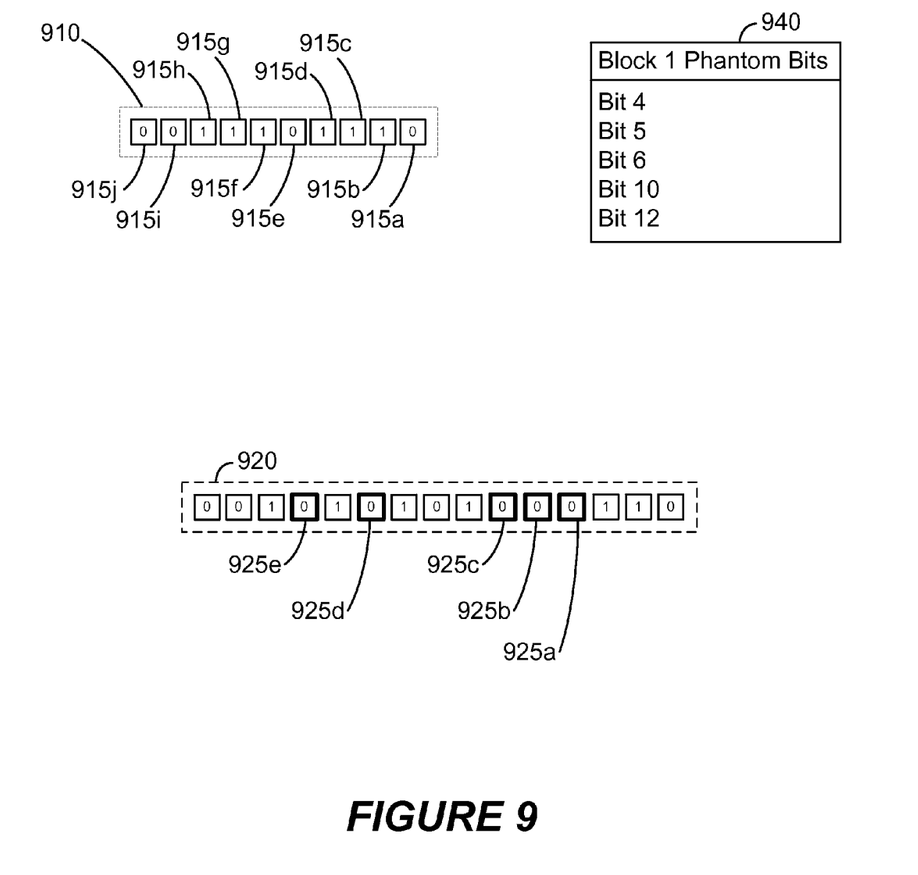
FIG. 9 illustrates an example of adding "padding bits" to a configuration bit stream to replace missing phantom bits according to an exemplary embodiment.

FIG. 9 is an example of generating a configuration bit stream based on a reduced configuration bit stream received from Configuration Bit Stream Source 630 and padding bits. In FIG. 9, Reduced Configuration Bit Stream 910 has ten bits corresponding to a Block 1 resource type, bits 915a (Bit One)-915j (Bit Ten). Additionally, Block 1 Phantom Bits 940 specifies that there are five phantom bits. Bits four, five, six, ten, and twelve of an original configuration bit stream have been removed and are thus missing from Reduced Configuration Bit Stream 910, as previously discussed. As such, Padded bits may be added by Control Block 610. Generated Configuration Bit Stream 920 includes padded bits along with the bits received from Reduced Configuration Bit Stream 910. In particular, Bits 915a-915c of Reduced Configuration Bit Stream 910 are output first in Generated Configuration Bit Stream 920. However, Bits 925a-925c correspond to bits four, five, and six in Block 1 Phantom Bits 940. As such, padding bits are output by Control Block 610. Accordingly, the rest of the bits of the Generated Configuration Bit Stream 920 are generated, including two additional padding bits at 925d and 925e to compensate for phantom bits ten and twelve as specified in Block 1 Phantom Bits 940. Thus, Generated Configuration Bit Stream 920 includes fifteen bits: ten bits from Reduced Configuration Bit Stream 910 and five padding bits.

Figure 10:
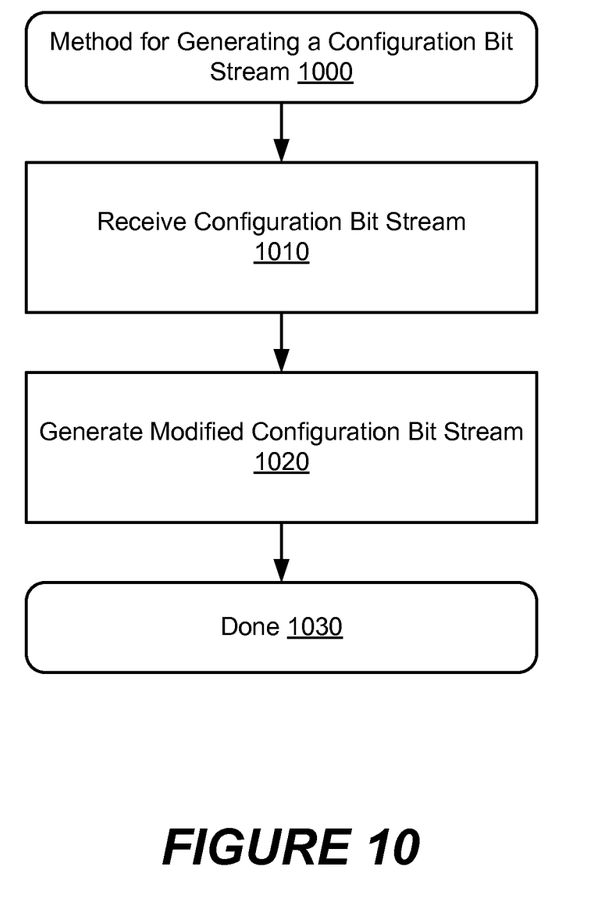
FIG. 10 is a flowchart illustrating a process flow for generating a configuration bit stream according to an exemplary embodiment.

FIG. 10 shows a flowchart of an example of a method 1000 for generating a configuration bit stream in accordance with some implementations. In method 1000, a configuration bit stream may be received at Block 1010. For example, a reduced configuration bit stream (i.e., a bit stream without phantom bits) may be received by a control block. Accordingly, at block 1020, the control block may generate a modified configuration bit stream by determining whether to output a padding bit or a bit from the reduced configuration bit stream received by the control block. As previously discussed, the control block may read or receive information regarding the mapping and resource information of the PLD. As such, the control block may determine whether to generate a padding bit, such as a "0," or output a bit from the reduced configuration bit stream. At block 1030, the padding bits are added for phantom bits and bits corresponding to the reduced configuration bit stream are output.

Figure 11:
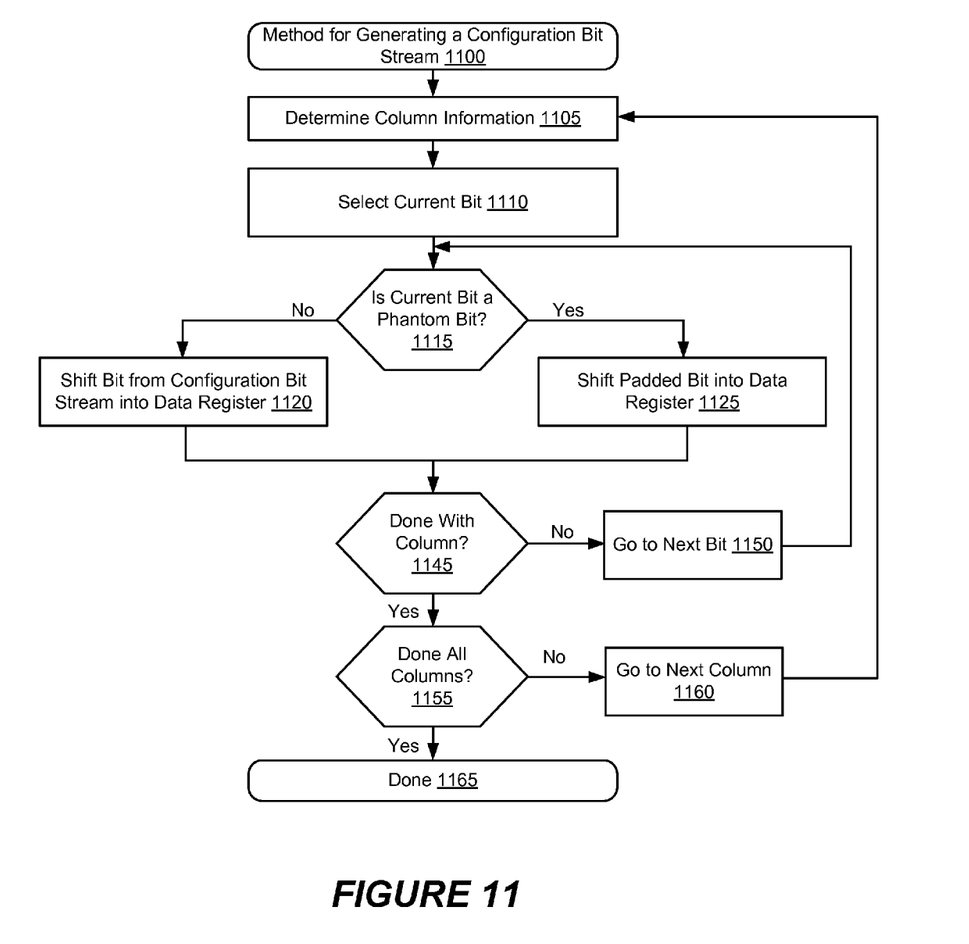
FIG. 11 is another flowchart illustrating a process flow for generating a configuration bit stream according to an exemplary embodiment.

FIG. 11 shows a flowchart of an example of a method 1100 for generating a configuration bit stream in accordance with some implementations. In method 1100, information on a particular column (e.g., a particular LAB or DSP column) may be determined at block 1105. For example, a control block may access design information to determine the type of resource (e.g., a LAB or DSP), number of rows of the resource being used by a particular column, such as the first column that is to be configured, and the phantom bits for the resource type used in the column.

At block 1110, a current bit may be selected. The control block may increment bit-by-bit. For example, the control block may select bit one of the first resource as the first current bit.

Accordingly, at block 1115, a determination is made as to whether a padding bit or a bit from the reduced configuration bit stream may be shifted into the Data Registers based on the phantom bits for the resource type. If the current bit is determined to be missing from the reduced configuration bit stream because it was a phantom bit, then a padded bit, such as a "0" or a "1," may be shifted into the Data Registers at block 1125. Alternatively, if the current bit is not a phantom bit, then a bit from the reduced configuration bit stream may be shifted into the Data Registers at block 1120.

At block 1145, a determination is made whether an entire column has been accounted for (i.e., whether all of the padding bits and bits from the reduced configuration bit stream for the column have been shifted into the Data Registers). If not, then at block 1150, the next bit may be selected as the current bit. The next bit may be a bit within the same row (e.g., the same LAB) or a bit in the next row (e.g., the next LAB within the column). Method 1100 may increment through the bits by fully incrementing through all of the bits of a row (e.g., a LAB) before going to the next row within the column. Alternatively, sections of rows may be incremented through at a time (e.g., the first column of CRAM cells for each row in the column followed by the second column of CRAM cells for each row in the column, and so forth). In general, the bits may be incremented in the general order of the reduced configuration bit stream along with considering the missing phantom bits. Accordingly, the process of block 1115 is repeated for another bit, as discussed above.

At block 1155, a determination is made as to whether all columns within the PLD have been accounted for. For example, if a PLD has 100 columns, the preceding blocks must be performed for all 100 columns. If not, then at block 1160, the next column is selected and the method proceeds to block 1105. If the method is done with all columns, then at block 1165, the method is done. Thus, a configuration bit stream has been generated based upon the reduced configuration bit stream and padding bits.

In some implementations, a configuration bit stream may be compressed. Accordingly, the configuration bit stream may be decompressed and then subject to method 1100 and other implementations disclosed herein. In other implementations, portions of the configuration bit stream may be decompressed portion-by-portion. Portions may then be subjected to method 1100.

Although method 1100, and other implementations disclosed herein, are used for a PLD wherein each column has a number of rows of a single resource, other implementations and arrangements may be utilized. For example, other implementations may have a PLD organized into rows, with each row including multiple columns of resources. In another implementation, a column may stretch across the entire PLD or core or array of the PLD. In other implementations, a mix of columns and rows may be present. In another implementation, columns may have multiple types of resources. For example, a column may include alternating DSP Modules and LAB Modules. Other columns may only include DSP Modules or LAB Modules. In other implementations, a column adjacent to hard IP blocks may include the same number of resources as other columns not adjacent to hard IP blocks, but the arrangement of resources within the column may be different. Accordingly, in any design architecture, design information on the PLD may be accessed or received by the control block in order to determine when to include the padding bits when generating a new configuration bit stream based on the reduced configuration bit stream without phantom bits.

Additionally, a mix of configurable elements may be used in a PLD. In one implementation, CRAM cells as well flip-flops may be used. For example, CRAM cells and flip-flops may share the coordinate system provided by the Address and Data Registers. In an implementation, CRAM cells may be used in the core of the PLD while flip-flops may be used in periphery circuitry such as the I/Os (i.e., inputs and outputs). Configuration elements may also include antifuses, fuses, flash, or any other type of element that may be configured or programmed. Accordingly, a mix of configurable elements may be used.

What is claimed is:

1. A method for configuring a configurable circuit, the method comprising:
   receiving, by the configurable circuit, a first configuration bit stream; and
   generating, by the configurable circuit, a second configuration bit stream, the second configuration bit stream including at least one padding bit and at least one bit from the received first configuration bit stream, wherein the at least one padding bit corresponds to a location in the configurable circuit without a corresponding configuration element, and wherein the at least one padding bit is included based on information of a design of the configurable circuit, the information of the design of the configurable circuit indicating a distribution of resources types in the configurable circuit.

2. The method of claim 1, wherein the at least one bit from the received first configuration bit stream included in the second configuration bit stream corresponds to a location in the configurable circuit with a corresponding configuration element.

3. The method of claim 2, wherein the configuration element is a configuration random access memory (CRAM) cell.

4. The method of claim 1, wherein the information of a design of the configurable circuit includes a distribution of bits without corresponding configuration elements for a resource type.

5. The method of claim 1, wherein the information of a design of the configurable circuit includes a distribution of bits with corresponding configuration elements for a resource type.

6. The method of claim 1, wherein the information of a design of the configurable circuit is stored in the configurable circuit.

7. The method of claim 6, wherein at least a portion of the information of a design of the configurable circuit that is stored in the configurable circuit is from a header portion of the received first configuration bit stream.

8. A circuit for generating a configuration bit stream for a configurable circuit, the circuit comprising:
   an input for receiving a first configuration bit stream; and
   a bit stream generation circuit, the bit stream generation circuit configured to generate a second configuration bit stream including at least one padding bit and at least one bit from the received first configuration bit stream, wherein the at least one padding bit corresponds to a location in the configurable circuit without a corresponding configuration element, and wherein the at least one padding bit is included based on information of a design of the configurable circuit, the information of the design of the configurable circuit indicating a distribution of resources types in the configurable circuit.

9. The circuit of claim 8, wherein the at least one bit from the received first configuration bit stream included in the second configuration bit stream corresponds to a location in the configurable circuit with a corresponding configuration element.

10. The circuit of claim 9, wherein the configuration element is a configuration random access memory (CRAM) cell.

11. The circuit of claim 8, wherein the information of a design of the configurable circuit includes a distribution of bits without corresponding configuration elements for a resource type.

12. The circuit of claim 8, wherein the information of a design of the configurable circuit includes a distribution of bits with corresponding configuration elements for a resource type.

13. The circuit of claim 8, wherein the information of a design of the configurable circuit is stored in the circuit.

14. A circuit for generating a configuration bit stream for a configurable circuit, the circuit comprising:
- means for receiving a first configuration bit stream; and
- means for generating a second configuration bit stream including at least one padding bit and at least one bit from the received first configuration bit stream, wherein the at least one padding bit corresponds to a location in the configurable circuit without a corresponding configuration element, and wherein the at least one padding bit is included based on information of a design of the configurable circuit, the information of the design of the configurable circuit indicating a distribution of resources types in the configurable circuit.

* * * * *